Patented Sept. 28, 1943

2,330,222

UNITED STATES PATENT OFFICE 2,330,222

N-POLYHYDROXYALKYLATED AMINES OF THE BENZENE SERIES

Richard Kuhn and Rudolf Ströbele, Heidelberg, Germany, assignors to Winthrop Chemical Company, Inc., New York, N. Y., a corporation of New York No Drawing. Application July 23, 1936, Serial No. 92,248. In Germany July 31, 1935

14 Claims. (Cl. 260—211)

This invention relates to a process of preparing N-polyhydroxyalkylated ortho-diamines of the benzene series and to certain products obtainable by such a process.

It is known that sugar can be condensed with aniline, whereby the so-called Schiff bases are formed. In the same manner also certain derivatives of aniline, for instance phenetidine and anthranilic acid, can be caused to react with sugar, whereby the corresponding azo methines are formed. These aniline derivatives can also be condensed without difficulty with benzaldehyde, whereby the corresponding benzylidene anilines are formed. However, not all aniline derivatives are capable of reacting with benzaldehyde, for instance the reaction capacity of the amino group of ortho-nitraniline is diminished by the nitro group to such an extent that the condensation with benzaldehyde can no longer be performed.

In accordance with the present invention in a surprising manner nitro-amino compounds of the benzene series, that is ortho-nitroaniline and its C-substitution products can be reacted with sugars particularly at elevated temperature. The condensation, however, is not complete but apparently leads to an equilibrium between sugar and the nitroaniline, on the one hand, and the condensation product, on the other. It has been found, however, that this condensation product does not have the type of the Schiff bases in which the amino group is connected with a carbon atom by means of a double bond, but is an N-glucoside which has, for instance, if a pentose is reacted with ortho-nitroaniline, one of the following formulae:

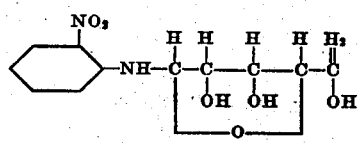

or

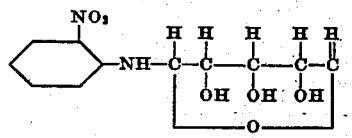

Sometimes two different condensation products having probably the above formulae can be isolated. The above formulae follow, for instance, from the number of acyl groups taken up by the condensation products upon acylation. The aforementioned condensation product of a pentose with ortho-nitroaniline yields, for instance, on acetylation a triacetyl compound. Accordingly, there are only three acetylatable hydroxyl groups whereas a Schiff base should contain four acetylatable hydroxyl groups. In an analogous manner the condensation products of hexoses take up only four acetyl groups.

The condensation is carried out with heating in the presence of a solvent which is inert to the starting materials. Preferably anhydrous alcohols are used. The condensation reaction is considerably facilitated and the equilibrium between the starting materials and the condensation product is shifted to the latter by the addition of hydrohalic acid salts of ammonia and alkylated ammonia compounds, for instance, ammonium chloride, methyl-, dimethyl- and trimethyl-amine - hydrochloride, tetramethyl ammonium chloride and the higher homologues of the said compounds as well as other halides, that is the fluorides, bromides and iodides. These hydrohalic acid salts are effective even in very small quantities, for instance if they are present in the reaction mixture in less than 1%. They catalyze the reaction also in those cases in which, when using the starting materials without any addition, the condensation takes place only to a small extent. Unchanged starting materials may be separated from the condensation product formed by adsorption, preferably by chromatographic adsorption and elutriation (compare "Zeitschrift für physiologische Chemie," vol. 220 (1933), page 247 and seq.). The recovered starting materials can be brought into reaction again and again, so that they are quantitatively consumed for the condensation. The ortho-nitroaniline compound may be used in excess.

The glucosido-amino-ortho-nitro compounds can be transformed into diamino compounds by the action of reducing agents. Depending on the reduction power of the reducing agent used, either the nitro- and glucosido-amino-group are simultaneously reduced to the amino and polyhydroxyalkylamino group, or only the nitro group is transformed into the amino group while the glucosido linkage remains unattacked. As reducing agent preferably catalytically activated hydrogen is used but also other reducing agents, for instance, zinc dust of aluminium amalgam may be used. If the catalytic hydrogenation is carried out in the presence of a particularly active catalyst and a relatively large quantity of the catalyst such as the usual nickel, platinum or palladium catalysts, and the hydrogenation is supported by increased pressure and temperature, the simultaneous reduction of the nitro and glucosido group takes place with the formation of N - polyhydroxyalkyl - ortho - phenylene diamines, for instance, of the formula:

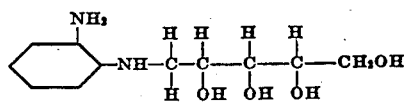

The said double reduction is further facilitated by the addition of a borate buffer of weakly alkaline reaction, for instance, mono-sodium and potassium borate to the reduction mixture.

The N-mono-glucosido-ortho-phenylene diamines are mainly obtained by carrying out the reduction under mild conditions, for instance, with small quantities of the catalyst at normal pressure and temperature, advantageously in the presence of organic bases, such as trimethyl- and triethylamine. The N-glucosido linkage remains practically unattacked, particularly if the acyl derivatives of the glucosido-amino-ortho-nitro-anilines are subjected to hydrogenation in the presence of the organic bases. The acyl radicals can be readily split off after reduction of the nitro group by mild saponification agents, for instance, alcoholic ammonia solution.

The N - glucosido-ortho - phenylenediamines thus obtainable are readily split to the starting sugar and ortho-phenylenediamine by the action of dilute mineral acids. On being subjected to condensation with alloxane in accordance with the process described in copending application Serial No. 29,732, filed July 3, 1935, now Patent No. 2,238,874 granted April 15, 1941, they form 9-glucosido-isoalloxazines. Contrary thereto the above described N - polyhydroxyalkyl - ortho-phenylenediamines are stable when treated with dilute mineral acids and yield with alloxane 9-polyhydroxyalkyl-isoalloxazines. The use of the borate buffer in the reduction of the glucosido-amino-nitro-benzenes has the particular advantage that the borate content of the reduction product may be directly utilized for the condensation with alloxane since in accordance with the process described in the said copending application Ser. No. 29,732 the presence of borate particularly favors this condensation.

The invention is further illustrated by the following examples without being restricted thereto, the parts being by weight:

*Example 1.*—10 parts of 4.5-dimethyl-1-amino-2-nitrobenzene and 9 parts of d-ribose are heated in 200 parts of absolute alcohol to 130° C. for 6 hours in a bomb tube. After cooling the reddish brown clear solution is chromatographed with aluminium oxide. After washing with absolute alcohol the non-reacted nitroxylidine is quantitatively present in the filtrate, the condensation product (40% of the theory) being in the middle of the chromatogram as a yellow zone. This zone is now elutriated with 80% methanol till the solution running off is only faintly yellow colored. After this elutriation the main quantity of the non-reacted sugar is still present in the chromatogram and can be removed by frequent washing with 20% methanol. The solution of the reaction product which on treatment with acetic acid anhydride in the presence of pyridine yields the 1-(triacetyl-d-ribosidoamino)-2-nitro-4.5-dimethylbenzene melting at 163° C. and therefore is a 1-(d-ribosidoamino)-2-nitro-4.5-dimethylbenzene is evaporated in vacuo to about 50 parts, treated with 150 parts of absolute alcohol and reduced with platinum oxide at a pressure of one atmosphere above normal pressure. In this manner a solution of a mixture of 1 - d - ribosidoamino- and 1-d-ribitylamino-2-amino-4.5-dimethylbenzene is obtained. On condensation with alloxane the 6.7-dimethyl-9-d-ribityl- and 9-d-ribosido-iso-alloxazine are obtained.

The 1-(d-ribosidoamino) - 2 - nitro - 4.5 - dimethylbenzene is also obtained by heating 2.6 grams of d-ribose and 13 grams of 1-amino-2-nitro-4.5-dimethylbenzene in 60 ccs. of absolute alcohol in the boiling water-bath for about 6 hours under reflux. After prolonged standing in the refrigerator the precipitated unchanged 1-amino-2-nitro-4.5-dimethylbenzene is filtered with suction and washed with cold alcohol. The filtrate, as indicated above, is chromatographed. The 1-(d-ribosidoamino)-2-nitro-4.5-dimethylbenzene separates from the concentrated solution in the form of small, yellow leaflets which, after recrystallization from alcohol, melt at 164° C.

*Example 2.*—5 parts of 4.5-dimethyl-2-nitro-1-aminobenzene and 1 part of l-arabinose are heated in 40 parts of absolute alcohol to 100–110° C. for five hours. After allowing the solution to cool, it is chromatographed with aluminium oxide. On washing with alcohol, the excess of the 4.5-dimethyl-2-nitro-1-aminobenzene is in the filtrate. The distinct orange red zone of the chromatogram is then elutriated with 80% aqueous methanol, whereby 1.5 parts of the condensation product are obtained (i. e. 75% of the theory). By means of acetic acid anhydride in the presence of pyridine a triacetyl compound is obtained in the form of light yellow crossed little sticks melting at 212° C.

By catalytic reduction with platinum or palladium and hydrogen the 1-l-arabinosidoamino-2-amino-4.5-dimethyl-benzene is obtained.

When using instead of l-arabinose d-arabinose corresponding compounds derived from d-arabinose are obtained.

On treating 1-(triacetyl-l-arabinosidoamino)-2-nitro-4.5-dimethylbenzene in about 20 parts of acetic acid methyl ester in the presence of 0.15 part of platinum oxide and 1.5 parts of triethylamine with hydrogen at 20° C. and at a pressure of one atmosphere above normal pressure, the solution decolorizes after about 1 hour. The reduction product on condensation with alloxane in the presence of boric acid and glacial acetic acid yields the 9-(triacetylarabinosido)-6.7-dimethyl-isoalloxazine in the form of thin yellow needles melting at 239° C. By treatment with anhydrous ammoniacal methylalcohol at ordinary temperature the 9-(l-arabinosido)-6.7-dimethyl-isoalloxazine is obtained therefrom in the form of a hygroscopic substance which is soluble in water, alcohol, glacial acetic acid and pyridine with yellow color and strong green fluorescence and insoluble in ether and benzene.

On treating the 9-(triacetyl-l-arabinosido)-6.7-dimethyl-isoalloxazine with dilute hydrochloric acid the 6.7-dimethyl-alloxazine is obtained while splitting off the triacetyl-l-arabinose radical.

In the above described manner when using glucose the 1-glucosidoamino-2-nitro-4.5-dimethylbenzene of analogous properties is obtained.

When using fructose 1-fructosidoamino-2-nitro-4.5-dimethylbenzene showing analogous properties is obtained.

*Example 3.*—15 grams of ortho-nitroaniline are heated with 3 grams of d-arabinose in 100 ccs. of 96% alcohol with the addition of 1 cc. of 2-normal acetic acid for 3 hours under reflux. The solution is concentrated to 20 ccs., treated with hot benzene and extracted with water. The aqueous solution is again extracted with benzene until no more is taken up by the benzene. From the aqueous solution the 1-(d-arabinosidoamino)-2-nitrobenzene may be obtained by evaporation. On heating with dilute hydrochloric acid it is split up into d-arabinose and orthonitroaniline.

*Example 4.*—10 parts of 4.5-dimethyl-1-amino-2-nitrobenzene and 9 parts of d-ribose are heated to boiling in 100 parts of absolute alcohol with the addition of 0.6 part of methylamine-hydrochloride or ammonium chloride for 2 hours under reflux. The alcohol which condenses in the cooler passes into a second vessel wherein it is freed from the water formed by means of potassium carbonate, magnesium perchlorate, calcium chloride or the like. From the second vessel the absolute alcohol is redistilled into the reaction vessel. After two hours the solution is cooled, whereupon the reaction mixture solidifies to a dense magma of thin orange yellow needles of di-ribose-2-nitro-4.5-dimethylanilide.

A similar result is obtained when using other amine salts, such as di- and trimethylamine-hydrochloride, -bromide or -iodide or the corresponding salts of ethyl-, propyl-, ethanolamines, etc.

*Example 5.*—9 parts of d-ribose and 22.5 parts of 4.5-dimethyl-1-amino-2-nitrobenzene are boiled with the addition of 0.5 part of methylamine-hydrochloride in 90 parts of absolute alcohol as indicated in Example 4 for 2 hours under reflux. When treating the mixture chromatigraphically (compare Example 1) crystallized d-ribose-2-nitro-4.5-dimethylanilide is obtained in a more than 80% yield: $[\alpha]_D^{20}=+90°$ C. in 35% solution of pyridine. The triacetyl compound obtained therefrom by means of pyridine and acetic acid anhydride in a quantitative yield crystallizes from alcohol in yellow bevelled prisms melting at 163° C.: $[\alpha]_D^{20}=+160°$ C. in 0.18% solution of methylacetate.

From d-glucose and ortho-nitroaniline the 2-nitro-d-glucose-anilide is obtained in the above described manner in orange yellow little sticks. The triacetyl compound melts at 184° C.: $[\alpha]_D^{20}=-75°$ C. in 0.53% solution of methylacetate.

From l-arabinose and ortho-nitroaniline the 2-nitro-arabinose-anilide is obtained in an analogous manner in orange yellow little sticks. The triacetyl compound melts at 151° C.:
$$[\alpha]_D^{22}=+134° C.$$
in 0.64% solution of methylacetate.

d-Xylose and ortho-nitroaniline yield the 2-nitro-d-xylose-anilide in thin yellow needles. The triacetyl compound melts at 149° C.

l-Arabinose and 1.2-dimethyl-4-amino-5-nitrobenzene yield the 1-arabinose-2-nitro-4.5-dimethylanilide in orange yellow thin needles. The yield amounts to more than 80%. The triacetyl compound melts at 212° C.: $[\alpha]_D^{20}=+133°$ C. in 0.17% solution of methylacetate.

d-Arabinose and 1.2-dimethyl-4-amino-5-nitrobenzene yield the reflected image of the compound described above. The triacetyl compound melts at 212° C.: $[\alpha]_D^{20}=-137°$ C. in 0.12% solution of methylacetate.

*Example 6.*—10 parts of d-ribose-2-nitro-4.5-dimethylanilide are introduced into 2000 parts of 75% ethylalcohol with the addition of 80 parts of 0.4 normal $NaH_2BO_3$-solution and 50 parts of palladium-barium sulfate (4%) at 50–60° C. for 8 hours at an excess pressure of 40 atmospheres while stirring with hydrogen. After cooling the mixture is centrifuged off from the catalyst, washed with 75% ethyl alcohol and evaporated to dryness under reduced pressure. The 1-d-ribitylamino-2-amino-4.5-dimethylbenzene is obtained as residue. When it is immediately poured over with 400 parts of glacial acetic acid in which 7 parts of finely powdered alloxane-monohydrate are suspended the mixture is left standing over night at about 8° C. and the separated boric acid compound of the vitamine is centrifuged off, dissolved in 1000 parts of cold water, filtered from traces of 6.7-dimethyl-alloxazine formed and left standing at room temperature, the boric acid compound which is readily soluble in water hydrolyzes and within a few hours the pure lactoflavine crystallizes out in orange yellow microscopic needles.

We claim:
1. In the process of preparing N-polyhydroxyalkylated ortho-diamines of the benzene series the step which comprises reacting upon 4.5-dimethyl-1-amino-2-nitrobenzene with ribose in an inert solvent while heating to reaction temperature.

2. In the process of preparing N-polyhydroxyalkylated ortho-diamines of the benzene series the step which comprises reacting upon an ortho-nitro-amino compound of the benzene series having a replaceable hydrogen atom in the amino group with a sugar of 5 to 6 carbon atoms in an inert solvent and a hydrohalic acid salt of an ammonia compound selected from the group consisting of ammonia and alkylated ammonia while heating to reaction temperature.

3. In the process of preparing N-polyhydroxyalkylated ortho-diamines of the benzene series the step which comprises reacting upon an ortho-nitro-amino compound of the benzene series having a replaceable hydrogen atom in the amino group with an aldopentose in an inert solvent and a hydrohalic acid salt of an ammonia compound selected from the group consisting of ammonia and alkylated ammonia while heating to reaction temperature.

4. In the process of preparing N-polyhydroxyalkylated ortho-diamines of the benzene series the step which comprises reacting upon an ortho-nitro-amino compound of the benzene series having a replaceable hydrogen atom in the amino group with ribose in an inert solvent and a hydrohalic acid salt of an ammonia compound selected from the group consisting of ammonia and alkylated ammonia while heating to reaction temperature.

5. The process which comprises reacting upon 4.5-dimethyl-1-amino-2-nitrobenzene with ribose in a liquid alcohol while heating to reaction temperature and subjecting the glucoside-like bound condensation product to catalytic hydrogenation.

6. The process which comprises reacting upon an ortho-nitro-amino compound of the benzene series having a replaceable hydrogen atom in the amino group with a sugar of 5 to 6 carbon atoms in an inert solvent and a hydrohalic acid salt of an ammonia compound selected from the group consisting of ammonia and alkylated ammonia while heating to reaction temperature and subjecting the glucoside-like bound condensation product to catalytic hydrogenation.

7. The process which comprises reacting upon 4.5-dimethyl-1-amino-2-nitrobenzene with ribose in a liquid alcohol and a hydrochloric acid salt of an ammonia compound selected from the group consisting of ammonia and alkylated ammonia while heating to reaction temperature and subjecting the glucoside-like bound condensation product to catalytic hydrogenation.

8. N-glucoside-like condensation products of a sugar of 5 to 6 carbon atoms with an amino compound of the benzene series, which condensation products contain in the ortho-position to the glucoside-like substituted amino group a substituent selected from the group consisting of nitro and amino groups and the O-acyl derivatives of said condensation products.

9. N-glucoside-like condensation products of an aldopentose with an amino compound of the benzene series, which condensation products contain in the ortho-position to the glucoside-like substituted amino group a substituent selected from the group consisting of nitro and amino groups, and the O-acyl derivatives of said condensation products.

10. N-glucoside-like condensation products of ribose with an amino compound of the benzene series, which condensation products contain in the ortho-position to the glucoside-like substituted amino group a substituent selected from the group consisting of nitro and amino groups, and the O-acyl derivatives of said condensation products.

11. N-glucoside-like condensation products of a sugar of 5 to 6 carbon atoms with 1-amino-4.5-dimethylbenzene which is substituted in the 2-position by a substituent selected from the group consisting of nitro and amino groups, and the O-acyl derivatives of said condensation product.

12. N-glucoside-like condensation products of an aldopentose with 1-amino-4.5-dimethylbenzene which is substituted in the 2-position by a substituent selected from the group consisting of nitro and amino groups, and the O-acyl derivatives of said condensation products.

13. N-glucoside-like condensation products of ribose with 1-amino-4.5-dimethylbenzene which is substituted in the 2-position by a substituent selected from the group consisting of nitro and amino groups, and the O-acyl derivatives of said condensation products.

14. The process which comprises reacting upon an ortho-nitroamino compound of the benzene series having a replaceable hydrogen atom in the amino group with a sugar of 5 to 6 carbon atoms in an inert solvent while heating to reaction temperature and subjecting the glucoside-like bound condensation product to catalytic hydrogenation in the presence of a borate buffer of weakly alkaline reaction.

RICHARD KUHN.
RUDOLF STRÖBELE.